D. K. ALLISON.
PAN ELEVATOR AND CONVEYER.
APPLICATION FILED JUNE 28, 1912.
1,056,767.
Patented Mar. 25, 1913.
3 SHEETS—SHEET 3.
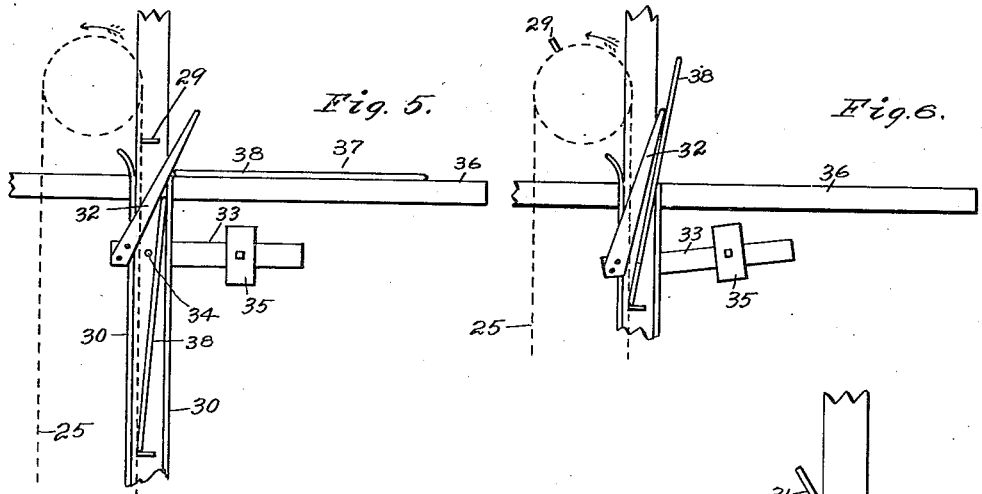
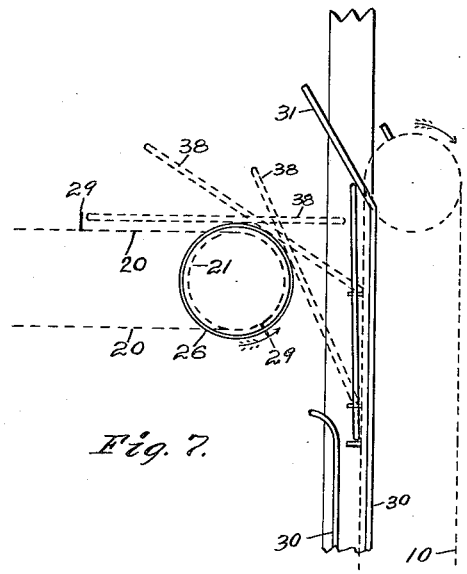
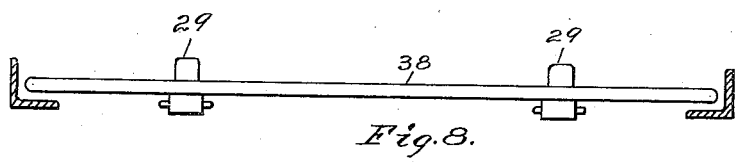
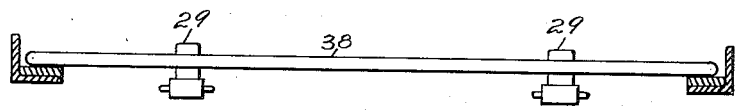
Witnesses
J. C. Lemon
B. A. Pinkney
Inventor
Daniel K. Allison

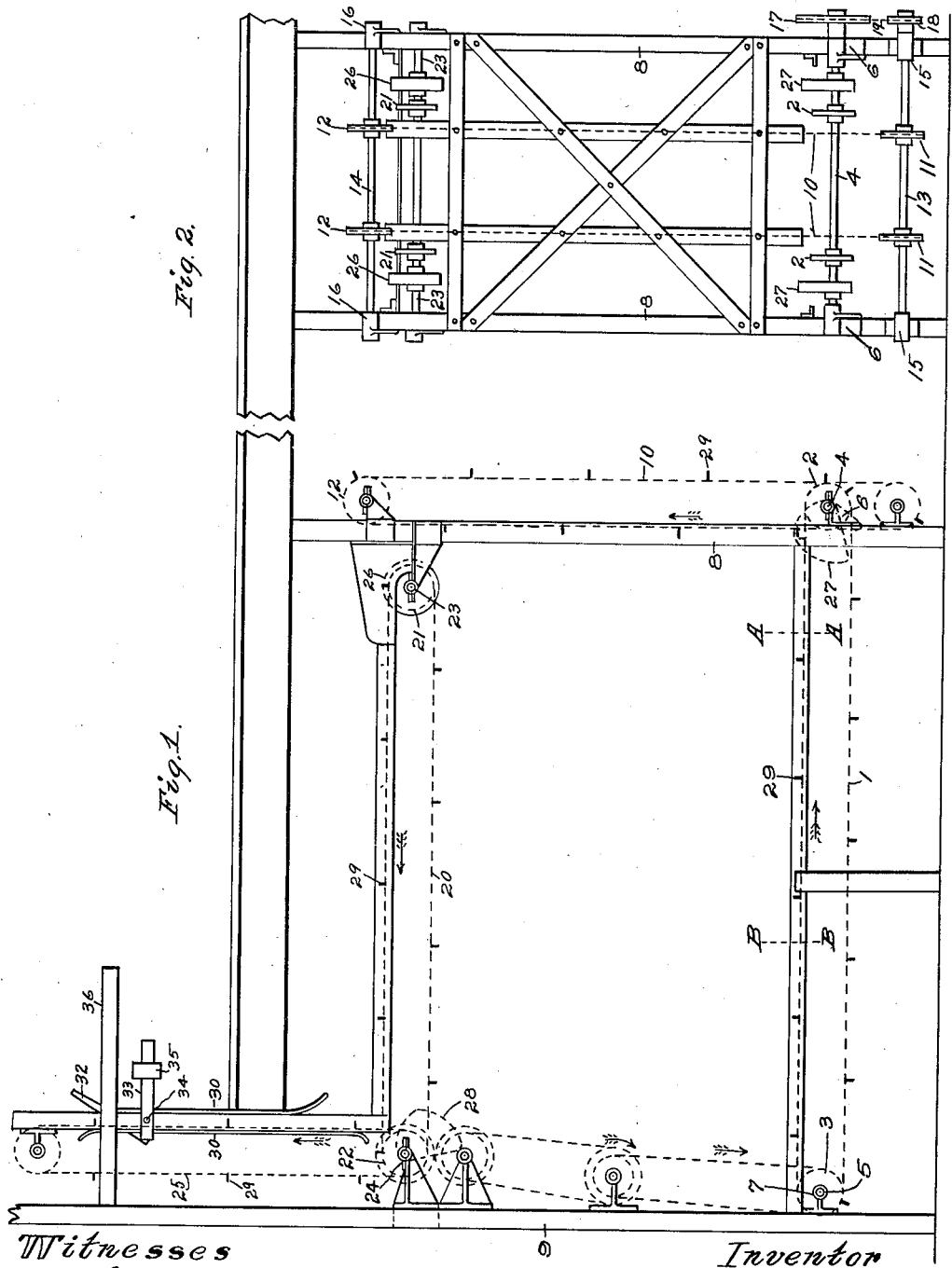

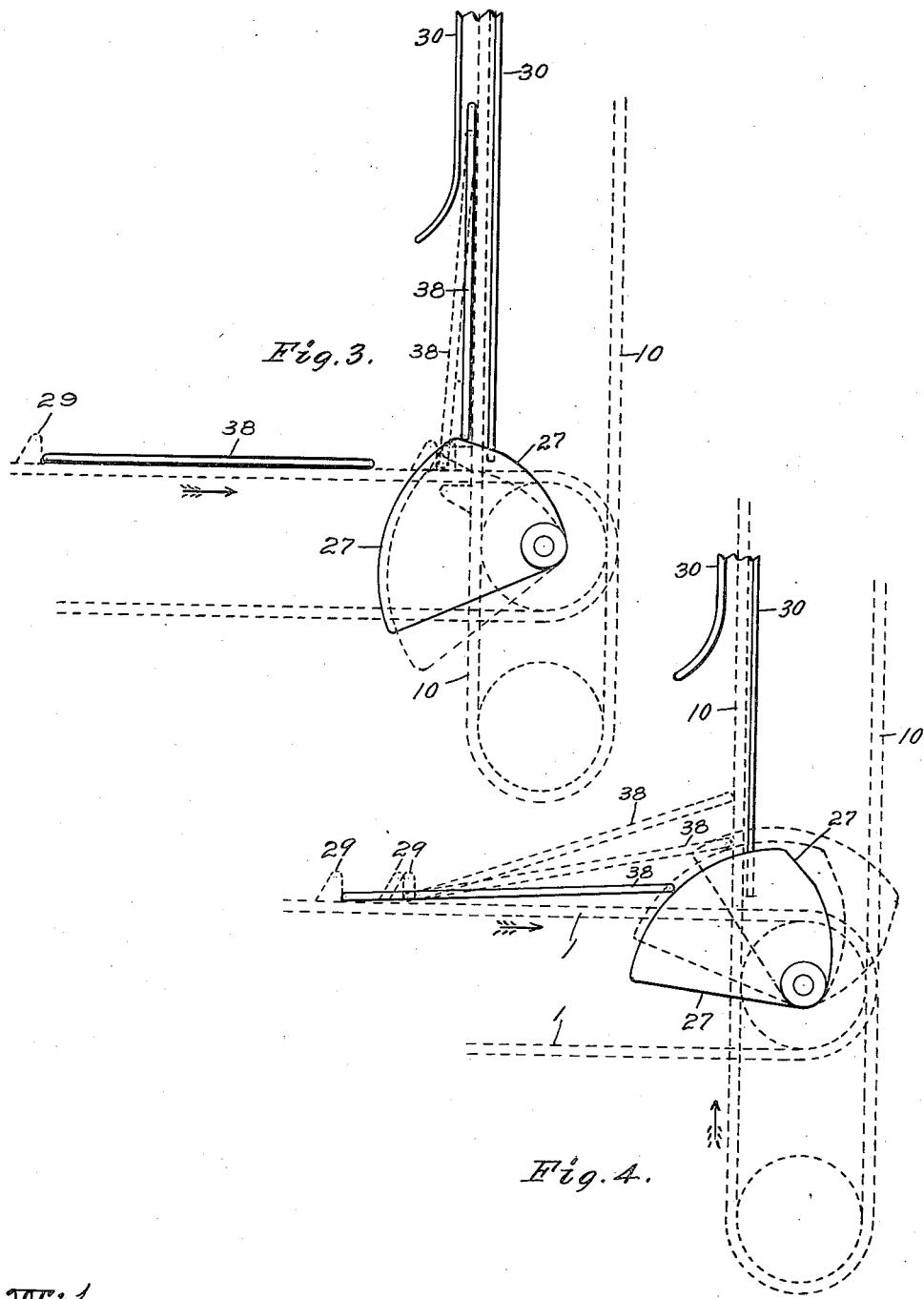

UNITED STATES PATENT OFFICE.

DANIEL K. ALLISON, OF CINCINNATI, OHIO, ASSIGNOR TO THE J. H. DAY COMPANY, OF CINCINNATI, OHIO, A CORPORATION OF OHIO.

PAN ELEVATOR AND CONVEYER.

1,056,767.  Specification of Letters Patent.  Patented Mar. 25, 1913.

Application filed June 28, 1912. Serial No. 706,332.

*To all whom it may concern:*

Be it known that I, DANIEL K. ALLISON, a citizen of the United States, residing at Cincinnati, in the county of Hamilton and State of Ohio, have invented certain new and useful Improvements in Pan Elevators and Conveyers, of which the following is a specification.

My invention relates to conveying and elevating machines and the object thereof is to provide a machine upon which empty bake pans may be placed and automatically elevated and conveyed from one floor of a bakery to a floor above without the use of manual labor.

The novelty of my invention consists in the construction, combinations and arrangements of certain elements and mechanisms as will be herewith set forth and specifically claimed.

In the accompanying drawings, Figure (1) is a side elevation of my machine; Fig. (2) is an end elevation of Fig. (1); Fig. (3) is an enlarged detail showing the table chains, the table uptake chains and the cam and cooperating parts; Fig. (4) shows the same parts as Fig. (3); Fig. (5) is an enlarged detail of the pan discharging mechanism; Fig. (6) shows the same mechanism as Fig. (5); Fig. (7) is an enlarged detail of the upper part of the table uptake showing the pans in the process of turning over onto the return conveyer; Fig. (8) is a vertical transverse section through the conveyer table taken at B—B in Fig. (1), showing a pan resting upon the chains; Fig. (9) is a similar section taken at A—A, but shows the pan elevated a little above the conveyer chains.

The machine consists essentially of a number of endless conveyer chains preferably arranged in pairs and traveling in both horizontal and vertical directions and mechanisms cooperating therewith by which pans conveyed by said chains are transferred from one set of chains to another, thereby effecting a change in their direction of travel from horizontal to vertical and vice versa.

The horizontal chains 1—1 are mounted upon and carried by the sprocket wheels 2—2 and 3—3, which in turn are mounted on transverse shafts 4 and 5 respectively. These shafts are journaled in suitable bearings 6—6 and 7—7 mounted upon the frames 8 and 9 respectively. The cams 27—27 are securely mounted on shaft 4 and rotate therewith. The vertical chains 10—10 are mounted on and carried by sprocket wheels 11—11 and 12—12 which, in turn, are mounted on transverse shafts 13 and 14 respectively. These shafts also are journaled in suitable bearings 15—15 and 16—16 mounted upon said frame 8. Shaft 4 drives shaft 13 through sprocket wheels 17 and 18 and chain 19. The shaft 13 is arranged to rotate at a higher rate of speed than shaft 4. The horizontal chains 20—20 are mounted on and carried by the sprocket wheels 21—21 and 22—22. The sprocket wheels 21—21 are mounted on the transverse shaft 23 journaled in suitable bearings, which shaft also carries the pulleys 26—26. Sprocket wheels are similarly mounted upon the shaft 24 which shaft carries cams 28—28. These cams are similar to cams 27—27 and their functions are also similar. The vertical chains 25—25 are arranged and mounted in a similar manner to chains 10—10 and their functions are similar thereto. The conveyer chains are provided with projecting dogs 29 spaced uniformly, each of which is arranged to carry a separate pan.

The pans are placed upon the conveyer chains 1—1 between the projecting dogs, in the beginning of the operation, and are carried thereby in the direction indicated by the arrow. Fig. (3) shows a pan (38) resting upon said chains approaching the vertical chains (10). As the pan approaches still closer to said vertical chains its forward end is raised by contact with the rotating cam 27 as shown by full lines in Fig. (4). The rear end of the pan is now resting upon the chain (1) in front of the dog (29) being propelled thereby, while the forward end thereof is lifted off said chain and is resting upon the cam (27). Further progress of the pan will result in the forward end being lifted still higher. The height the cam lifts said forward end of the pan depends upon the shape of the cam. It will be seen that in case the pans were not lifted by said cam but contacted the vertical chains while resting horizontally upon the said chains 1—1 the impact of the forward end of the pan against the vertical chains 10 would result in the pan being bent out of shape and therefore the pans would not be carried upward by the chains 10. In Fig. (4) the dotted lines shows a second position of the pan having its forward end elevated and contacting the vertical chain 10. Henceforth the forward end of the pan must move in a vertical direction on account of the chain 10. It will be seen that while the rear end of said pan is moving horizontally a given distance the forward end thereof will move a greater distance, in a vertical direction. Consequently the forward end of the pan will travel at a higher rate of speed in a vertical direction than its rear end travels in a horizontal direction. On this account, I have arranged the chains 10—10 to travel at a higher rate of speed than the chains 1—1 and have determined this speed to be in unison with the vertical travel of the forward end of the pan when contacting the chain 10.

Now since the forward end of the pan and the chains 10—10 are arranged to travel in unison in a vertical direction at the point said pan contacts said chains the forward end thereof will be lifted up by pressure against said chains exerted by the dogs 29 of chain 1—1 and one position it will assume is shown in dotted lines in Fig. (4). As the rear end of the pan is now being propelled by the dogs 29 in a horizontal direction the pan will be carried up by the chain 10 and finally take a nearly vertical position, shown by dotted lines in Fig. (3). At this point the cam as shown in dotted lines will lift the pan shown in dotted lines to the position shown in full lines where it will be held against said chains 10—10 and retained in said position during a certain interval of time. While said pan is being so held by said cams dogs on the chains 10—10 will lift it off said cams and carry it upward, being held laterally between suitable guides 30—30. The cams 27—27 and shaft propelling same are arranged to make one rotation while the chains 1—1 are traveling the distance between two consecutive dogs 29—29. When the pan arrives at the terminus of its upward travel with the chain 10—10 its forward end contacts a deflector 31 which causes the pan to assume the various positions shown by dotted lines in Fig. (7) in the process of falling over onto the horizontal chains 20—20. In the act of said turning over the pans fall upon the pulleys 26—26 the peripheries of which are covered with leather or other suitable substance by which friction is produced in contact with the pans and the pans are therefore carried over by said pulleys and deposited on the chains 20—20 between the dogs 29—29. The pan will now be carried by the horizontal chains 20—20 and be transferred to the vertical chains 25—25 by means of the cams 28—28 in manner similar to that heretofore described. As the pans arrive at their point of discharge they will strike bar 32. This bar is arranged to cross the path of the pan and to swing out of said path, being secured to the bar 33, which is pivoted at the point 34 and weighted at one end by the block 35. The normal position of this device is shown in Fig. (5). Fig. (6) shows the position of a pan while being forced past said bar 32. During such process the weight 35 is lifted, the bar 32 is forced back into nearly a vertical position; and when the dog on the vertical chain has risen to the height of the discharge table 36 the pan will be pushed off said dog by said bar 32 and will lie in a horizontal position on said discharge table as indicated by 37 in Fig. (5).

While I have shown and described conveyer chains for conveying the pans I do not wish to limit myself thereby but wish to claim broadly any suitable endless conveyer which may be mounted upon and carried by rotating wheels or rollers.

Having fully described my invention and the operation thereof what I claim and desire to secure by Letters Patent is:—

1. In a pan elevator and conveyer a horizontally moving endless conveyer provided with projecting dogs suitable for carrying pans and a vertically moving endless conveyer also provided with dogs and means, coöperating with both conveyers, for raising the forward end of a horizontally moving pan to cause it to be carried upward by pressure against said vertical conveyer.

2. In a pan elevator and conveyer a horizontally moving endless conveyer having projecting dogs suitable for carrying pans and a vertically moving endless conveyer also having projecting dogs and means coöperating with both conveyers for raising the forward ends of said moving pans to cause them to contact said vertical conveyer at a point above said horizontal conveyer.

3. In a pan elevator and conveyer a horizontally moving endless conveyer having projecting dogs suitable for carrying pans and a vertically moving endless conveyer also having projecting dogs and a rotating cam, arranged to lift the forward ends of said moving pans successively and to hold the same in a lifted position till said pans contact said vertical conveyer.

4. In a pan elevator and conveyer a horizontally moving endless conveyer having projecting dogs suitable for carrying pans and a vertically moving endless conveyer also having projecting dogs and means for raising said pans into substantially a vertical position while resting on said horizontal conveyer together with means for lifting said pans above said horizontal conveyer and holding the same against said vertical conveyer during a certain interval.

5. An endless conveyer moving vertically provided with projecting dogs suitable for elevating pans, a fixed path constructed to guide said pans in a vertical direction while moving, and a weighted bar crossing the said path arranged to swing back to allow the said pans to pass upwardly and subsequently to force said pans off said dogs when elevated to a predetermined height.

DANIEL K. ALLISON.

Witnesses:
WALTER C. MUHLHAUSER,
LAWRENCE G. SIEBER.